US007661594B2

(12) United States Patent
Kennedy et al.

(10) Patent No.: US 7,661,594 B2
(45) Date of Patent: Feb. 16, 2010

(54) DISCRETE OPTICAL CORRELATION SYSTEM WITH ADJUSTABLE APERTURE

(76) Inventors: Douglas Brian Kennedy, 3525 Lemon La., Moab, UT (US) 84532; Gregory J Kennedy, 3210 E. George White Rd., Moab, UT (US) 84532

( * ) Notice: Subject to any disclaimer, the term of this patent is extended or adjusted under 35 U.S.C. 154(b) by 204 days.

(21) Appl. No.: 11/875,992

(22) Filed: Oct. 22, 2007

(65) Prior Publication Data

US 2008/0043468 A1    Feb. 21, 2008

Related U.S. Application Data

(63) Continuation-in-part of application No. 11/462,794, filed on Aug. 7, 2006, now Pat. No. 7,311,261.

(51) Int. Cl.
*G06K 7/10* (2006.01)
*G06K 7/14* (2006.01)

(52) U.S. Cl. .................. 235/462.22; 235/454; 235/455; 235/472.01; 362/186; 362/321

(58) Field of Classification Search .................. 235/454, 235/455, 472.01; 362/186, 321
See application file for complete search history.

(56) References Cited

U.S. PATENT DOCUMENTS 5,408,084 A *  4/1995  Brandorff et al. ........ 250/208.1
5,412,548 A *  5/1995  Yee ............................ 362/202
5,697,695 A * 12/1997  Lin et al. .................... 362/184
6,231,207 B1 *  5/2001  Kennedy et al. ............ 362/158
6,726,350 B1 *  4/2004  Herold ........................ 362/555
6,793,366 B2 *  9/2004  Chun ........................... 362/184
6,834,976 B2 * 12/2004  Galli ........................... 362/158
7,208,932 B1 *  4/2007  Chun ........................... 324/72.5
7,360,921 B1 *  4/2008  Greenspon .................. 362/205

* cited by examiner

*Primary Examiner*—Thien M. Le
*Assistant Examiner*—Tuyen K Vo
(74) *Attorney, Agent, or Firm*—Trent H. Baker; Baker & Associates PLLC

(57) ABSTRACT

The present invention relates to a discrete optical correlation system. One embodiment of the present invention includes a portable electrical illumination system and an optically opaque hollow module, configured to releasably couple to the portable electrical illumination system in a manner such that when the portable electrical illumination system is activated, the system produces a discrete correlated or focused illumination output. The portable electrical illumination system further includes a light emitting diode, a power source, a switch, and a coupling mechanism. The optically opaque hollow module further includes at least two openings, a hollow internal region, an optically opaque outer surface, and a coupling mechanism disposed on at least one of the at least two openings. A fourth embodiment relates creating an adjustable aperture between two optically opaque sleeves sliding over an optically transparent module coupled to the portable electrical illumination system.

20 Claims, 8 Drawing Sheets

US 7,661,594 B2

DISCRETE OPTICAL CORRELATION SYSTEM WITH ADJUSTABLE APERTURE

RELATED APPLICATIONS

This is a continuation in part application claiming priority to U.S. utility application Ser. No. 11/462,794 filed Aug. 7, 2006 now U.S. Pat. No. 7,311,261, the contents of which are incorporated by reference.

FIELD OF THE INVENTION

The invention generally relates to portable optical illumination systems and accessories. In particular, the present invention relates to a discrete optical correlation system.

BACKGROUND OF THE INVENTION

Portable illumination systems may be used to provide illumination in both dispersed and focused light patterns. Dispersed illumination systems allow light to transmit in a variety of directions, while focused illumination systems contain or focus light in a particular direction. Depending on the application and light source, a user may require dispersed light, focused light, or a combination thereof.

Various electrical illumination systems mimic the dispersed illumination characteristics of chemical light sticks. These systems involve transmitting an electrically powered light source into a translucent member such that the illumination from the light source is transmitted through the translucent portions of the translucent member. These electrical systems provide users with the advantage of turning on and off the illumination and replacing the power source so as to extend the operating life of the system. However, in certain applications a user may prefer to utilize a focused or correlated light source. While it is possible to carry both a dispersed and focused light system, it is generally preferable to carry a single unit that is capable of both types of illumination. Existing illumination systems provide configurations capable of dispersed illumination and a combination of focused and dispersed illumination. Unfortunately, these systems do not enable a dispersed lighting system to be conveniently adjusted to provide discrete focused illumination.

Therefore, there is a need in the industry for a discrete optical correlation system that can conveniently be used on or in conjunction with an existing portable illumination system in order to provide discrete correlated or focused illumination.

SUMMARY OF THE INVENTION

The present invention relates to a discrete optical correlation system. One embodiment of the present invention includes a portable electrical illumination system and an optically opaque hollow module, configured to releasably couple to the portable electrical illumination system in a manner such that when the portable electrical illumination system is activated, the system produces a discrete correlated or focused illumination output. The portable electrical illumination system further includes a light emitting diode, a power source, a switch, and a coupling mechanism. The optically opaque hollow module further includes at least two openings, a hollow internal region, an optically opaque outer surface, and a coupling mechanism disposed on at least one of the at least two openings. A second embodiment of the present invention includes a portable chemical illumination system and an optically opaque hollow module configured to releasably couple to the portable chemical illumination system such that when the portable chemical illumination system is activated, the system produces a discrete correlated or focused illumination output. A third embodiment of the present invention relates to an optically transparent illumination system and an optically opaque sleeve configured to releasably couple to the optically transparent illumination system so as to produce a discrete correlated or focused illumination output. A fourth embodiment relates to creating an adjustable aperture between two optically opaque sleeves for producing a directed illumination output. Various other combinations of portable illumination systems in conjunction with optically opaque hollow modules may be practiced in accordance with alternative embodiments of the present invention.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

The following description of the invention can be understood in light of the Figures, which illustrate specific aspects of the invention and are a part of the specification. Together with the following description, the Figures demonstrate and explain the principles of the invention. In the Figures, the physical dimensions may be exaggerated for clarity. The same reference numerals in different drawings represent the same element, and thus their descriptions will be omitted.

DETAILED DESCRIPTION OF THE INVENTION

Figure 1:
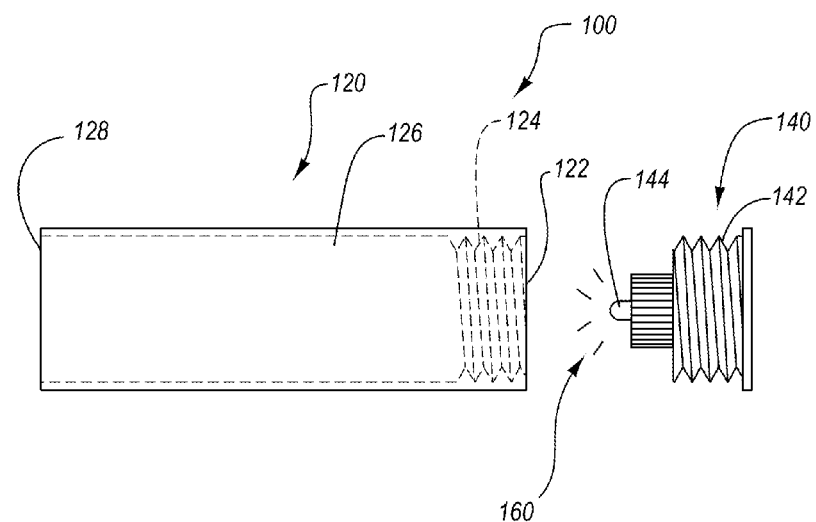
FIG. 1 illustrates a profile view of a discrete optical correlation system in accordance with one embodiment of the present invention, wherein the system is illustrated in a disassembled configuration.

The present invention relates to a discrete optical correlation system. One embodiment of the present invention includes a portable electrical illumination system and an optically opaque hollow module, configured to releasably couple to the portable electrical illumination system in a manner such that when the portable electrical illumination system is activated, the system produces a discrete correlated or focused illumination output. The portable electrical illumination system further includes a light emitting diode, a power source, a switch, and a coupling mechanism. The optically opaque hollow module further includes at least two openings, a hollow internal region, an optically opaque outer surface, and a coupling mechanism disposed on at least one of the at least two openings. A second embodiment of the present invention includes a portable chemical illumination system and an optically opaque hollow module configured to releasably couple to the portable chemical illumination system such that when the portable chemical illumination system is activated, the system produces a discrete correlated or focused illumination output. A third embodiment of the present invention relates to an optically transparent illumination system and an optically opaque sleeve configured to releasably couple to the optically transparent illumination system so as to produce a discrete correlated or focused illumination output. A fourth embodiment relates to creating an adjustable aperture between two optically opaque sleeves for producing a directed illumination output. Various other combinations of portable illumination systems in conjunction with optically opaque hollow modules may be practiced in accordance with alternative embodiments of the present invention. While embodiments of the present invention are directed at correlated illumination systems, it will be appreciated that the teachings of the present invention may also be applicable to other areas.

The following terms are defined as follows:

Illumination—wavelengths of light transmitted in a particular pattern including both visible (400-700 nm) and non-visible wavelengths.

Dispersed illumination—light that is transmitted in a plurality of three-dimensional directions; for example, an activated exposed residential light bulb transmits visible white light in a plurality of directions.

Correlated illumination—light that is substantially directed in a single direction. For example, correlated illumination includes an illumination in which there is a slight angle or expansion or contraction. In addition, a single light source may be manipulated to create both a correlated illumination and a dispersed illumination. For example, a conventional residential light shade often directs a somewhat correlated illumination directly above the light and a dispersed illumination all around the light.

Discrete correlated illumination—wavelengths of light that are substantially directed in a single direction while minimizing or eliminating dispersed light in all remaining three-dimensional directions. For example, a laser pointer produces a discrete correlated illumination output because a single visible dot is produced that does not substantially expand or contract over a distance. Conventional flashlights are not correlated because they typically transmit an expanding optical illumination output.

Electrical illumination system—an electrically powered system configured to generate visible or non-visible illumination a particular optical pattern, such as a conventional bulb or LED flashlight.

Chemical illumination system—a chemically powered system configured to generate visible or non-visible illumination in a particular optical pattern, such as a Cyalume™, KRILL™ Light, or Chemstick™.

Sleeve—a substantially cylindrical member having a first and second end. The first and second end may be lengthwise circular ends or widthwise straight ends while still forming the sleeve shape. For example, the widthwise straight ends may be wrapped around a tubular member to form the sleeve shape and may include a gapped region therebetween. Likewise, the lengthwise circular ends may be at the end of an entirely enclosed cylindrical tube.

Concave curved cutout—a concave cutout of material forming a concave shape extending along the side of an object.

Translation—a movement between two objects including one or more of rotational translation and extension translation.

Reference is initially made to FIG. 1, which illustrates a profile view of a discrete optical correlation system in accordance with one embodiment of the present invention, wherein the system is illustrated in a disassembled configuration. The system is designated generally at 100. The system 100 includes an optically opaque hollow module 120 and a portable electrical illumination system 140. The illustrated electrical illumination system 140 is a LAZERBRITE™2 system, but it should be appreciated that any portable electrical illumination system may be utilized in accordance with the present invention. In the disassembled configuration, the light or illumination 160 from the portable electrical illumination system 140 is allowed to transmit in a plurality of three-dimensional directions in a dispersed pattern.

The optically opaque hollow module 120 further includes a first opening 122, a coupling mechanism 124, a hollow internal region (not designated), an optically opaque outer surface 126, and a second opening 128. The illustrated hollow module 120 is shaped in a substantially hollow cylindrical tubular format. The coupling mechanism 124 facilitates an internal releasable coupling. The illustrated coupling mechanism 124 utilizes a threaded screw-in type system, but it should be appreciated that any internal, external, or other releasable coupling mechanism may be utilized in accordance with the present invention including but not limited to slidable, friction, threaded, keyed, etc. The first opening 122 allows a portable electrical illumination system 140 to be inserted into the module 120 to create an optically discrete internal region. It should be noted that a second coupling mechanism may be positioned on the opposite end of the optically opaque hollow module 120 for coupling other items. The optically opaque outer surface 126 is composed of a material that impedes light transmission, including but not limited to a black plastic composite material. The optically opaque outer surface 126 surrounds the internal hollow region. The internal hollow region may optionally be sanded or smoothed to also facilitate optical correlation. The elongated shaped and second opening 128 also facilitates optical correlated transmissions, as illustrated and described with reference to FIG. 2.

The electrical illumination system 140 includes a coupling mechanism 142 and an illumination source 144. The coupling mechanism 142 is configured to interface internally with the coupling mechanism 124 disposed on the optically opaque hollow module 120. The illumination source 144 may be any type of electrically powered light source including but not limited to halogen, fluorescent, LED, etc. The system 140 may further include a switch for turning on and off the system (not illustrated).

Figure 2:
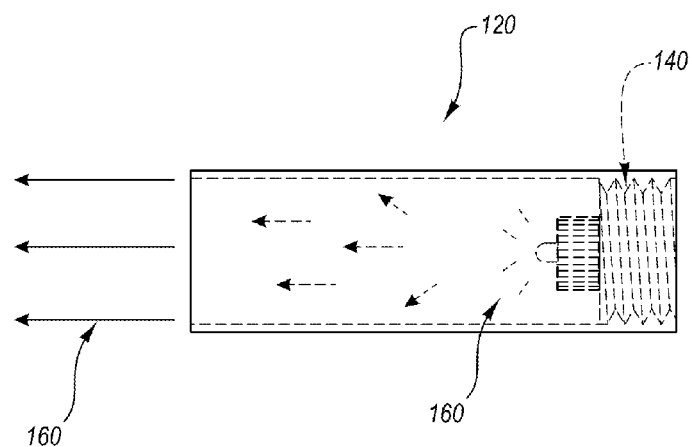
FIG. 2 illustrates a profile view of the system illustrated in FIG. 1 in an assembled configuration.

Reference is next made to FIG. 2, which illustrates a profile view of the system illustrated in FIG. 1 in an assembled configuration. The portable electrical illumination system 140 is internally coupled within the optically opaque hollow module 120 so as to create an optically discrete internal region. The illumination 160 from the portable electrical illumination system 140 is optically obstructed from transmitting out through the outer surface of the hollow module 120. The illumination 160 from the portable illumination system 140 is either reflected or absorbed by the internal surface of the optically opaque hollow module 120. The light 160 is therefore forced to transmit in a substantially correlated or focused pattern out the second opening 128 of the hollow module 120, as illustrated. It should be noted that the illumination 160 may exhibit a slight expanding or contracting angle and still be considered correlated.

Figure 3:
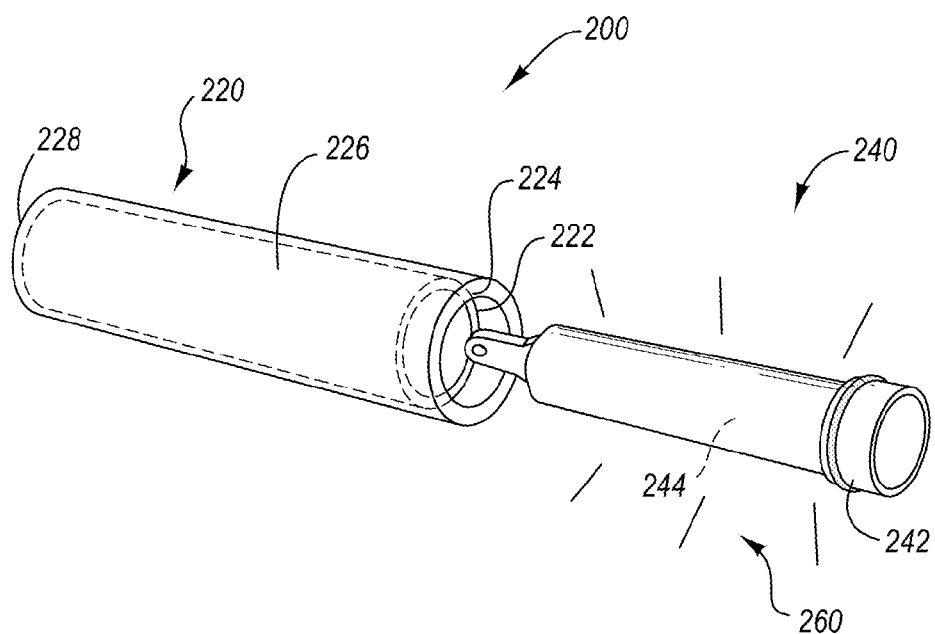
FIG. 3 illustrates a profile view of a discrete optical correlation system in accordance with a second embodiment of the present invention, wherein the system is illustrated in a disassembled configuration.

Reference is next made to FIG. 3, which illustrates a profile view of a discrete optical correlation system in accordance with a second embodiment of the present invention, wherein the system is illustrated in a disassembled configuration. The system is designated generally at 200. The system 200 includes an optically opaque hollow module 220 and a chemical illumination system 240. The illustrated chemical illumination system 240 is a conventional glow stick or CYALUME™ that utilizes a contained chemical composition to generate illumination in response to a particular trigger. The illumination system 240 includes a contained chemical composition 244 surrounded by a translucent cover and cap 242. The contained chemical composition 244 transmits light 260 through the translucent cover and cap 242 in a dispersed and/or diffused optical pattern. Various other chemical illumination systems may also be utilized in the system 200 in accordance with the present invention including but not limited to KRILL™ Light systems that utilize both chemical and/or electrical illumination. The optically hollow module 220 includes a first opening 222, a coupling mechanism 224, a hollow internal region (not designated), an optically opaque outer cover, and a second opening 228. The module 220 is similar to the module described above with reference to FIGS. 1 and 2. However, the particular coupling mechanism 224 is configured to releasably couple to the cap or end piece 242 disposed on the end of most chemical illumination systems. In addition, a cover (not illustrated) may be used to cover the first opening of the optically opaque hollow module 220 once the chemical illumination system 240 has been inserted within, so as to optically obstruct any illumination that is able to transmit through the first opening.

Figure 4:
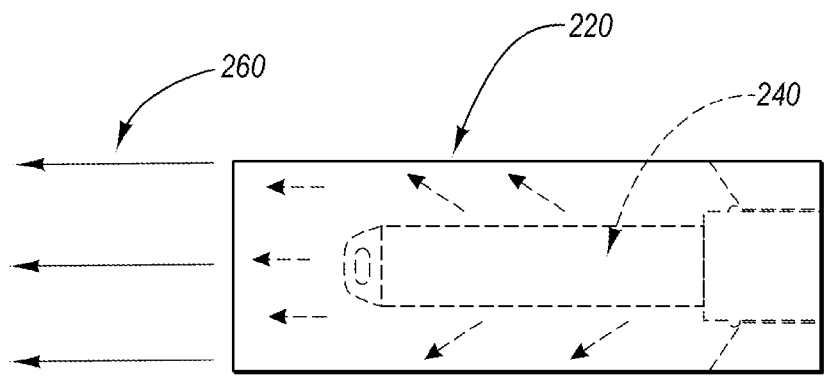
FIG. 4 illustrates a profile view of the system illustrated in FIG. 3 in an assembled configuration.

Reference is next made to FIG. 4, which illustrates a profile view of the system illustrated in FIG. 3 in an assembled configuration. The portable chemical illumination system 240 is internally coupled within the optically opaque hollow module 220 so as to create an optically discrete internal region. The illumination 260 from the portable chemical illumination system 240 is optically obstructed from transmitting out through the outer surface of the hollow module 220. The illumination 260 is either reflected or absorbed by the internal surface of the hollow module 220. The light 260 is therefore forced to transmit in a substantially correlated or focused pattern out the second opening 228 of the hollow module 220. As described above, if the portable chemical illumination system 240 allows light transmission out the first opening 222, it may be necessary to couple an optically opaque cap over the first opening 222 to optically obstruct this transmission.

In another alternative embodiment, a lens or combination of lenses may be fixed within the hollow opaque module to further collimate or focus the light transmission. Various individual and lens systems may be utilized including two lenses positioned at the focal lengths of one another. The lenses may be fixed at particular positions within the hollow opaque module utilizing grooves or coupling mechanisms.

In yet another alternative embodiment, the hollow opaque module may be shaped in a non-round configuration. Non-rounded shapes may be useful in preventing rolling and or allowing systems to be efficiently stacked against one another. For example, some form of rectangular like shape may be utilized. Various optical properties may also be produced using alternative form factors.

Figure 5:
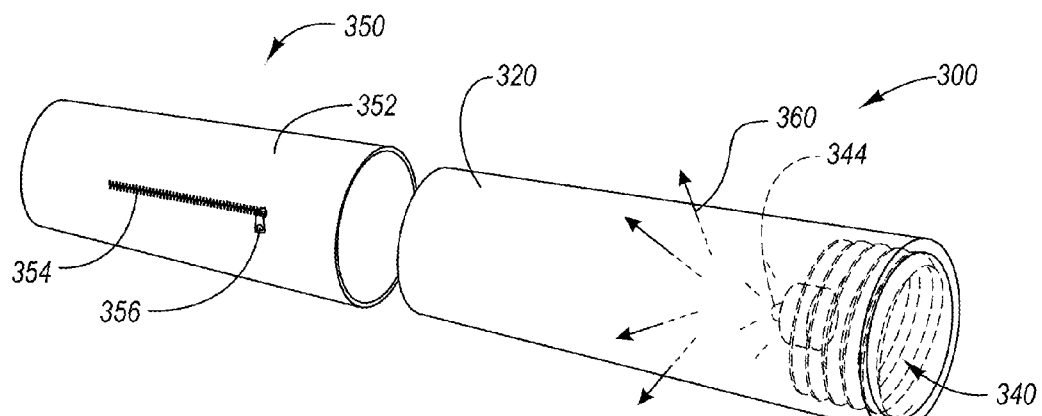
FIG. 5 illustrates a profile view of a discrete optical correlation system in accordance with a third embodiment of the present invention, wherein the system is illustrated in a disassembled configuration.

Reference is next made to FIG. 5, which illustrates a profile view of a discrete optical correlation system in accordance with a third embodiment of the present invention, wherein the system is illustrated in a disassembled configuration. The system includes an elongated transparent optical illumination system 300 and an optically opaque sleeve 350. The optical illumination system includes an elongated transparent member 320 and a portable illumination system 340. The elongated transparent member 320 is shaped in the form of a hollow cylinder with two open sides. The elongated transparent member 320 is composed of a transparent or translucent material such as plastic. The illustrated portable illumination system 320 is an electrically based system, but it will be appreciated that other types of portable illumination systems may also be used in accordance with the present invention. The portable illumination system 340 includes an illumination source 344 that produces illumination 360. The portable illumination system 340 may further include an electrical switch for switching between an on state in which the illumination source 344 produces illumination 360 and an off state in which the illumination source 344 does not produce illumination 360. The portable illumination system 340 is coupled to the transparent member 320 so as to position the illumination source 344 within the transparent member 320. The illustrated illumination 360 is shown transmitting through the elongated transparent member 320. The elongated transparent member 320 may diffuse or refract the illumination 360 in some way as it is transmitted through.

Figure 6:
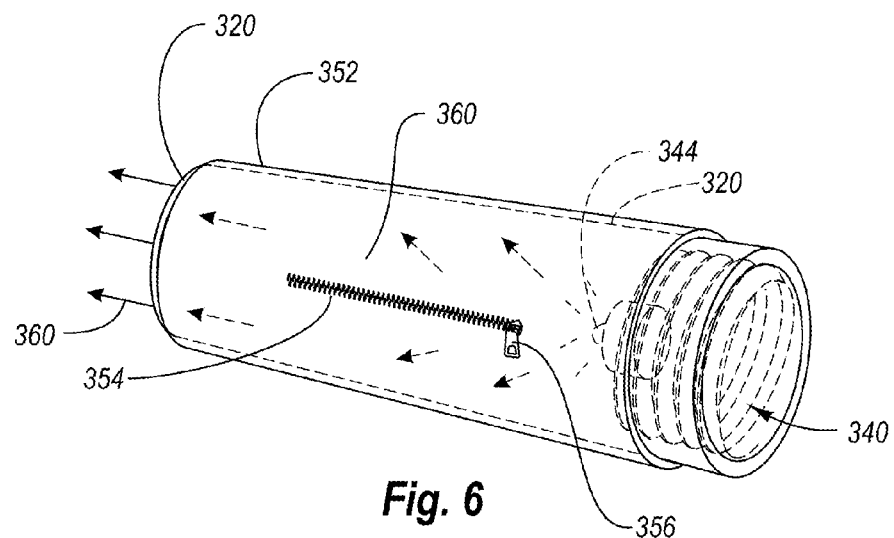
FIG. 6 illustrates a profile view of the system illustrated in FIG. 5 in an assembled configuration.
Figure 7:
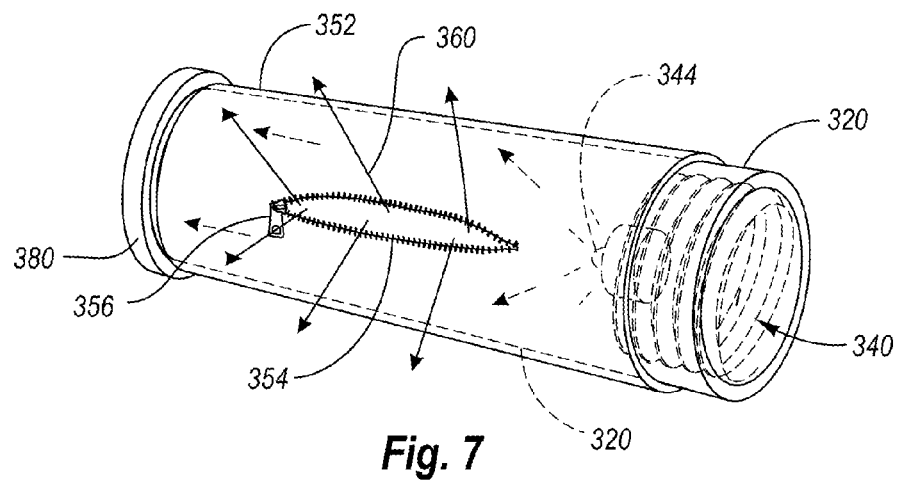
FIG. 7 illustrates a profile view of the system illustrated in FIG. 5 in an alternative assembled configuration in which an opening is selectively opened to produce a contained optical output.

The optically opaque sleeve 350 includes a flexible tube 352, and a releasable opening system. The flexible tube 352 is shaped in a manner to correspond to the elongated transparent member 320 of the illumination system 300. The flexible tube 352 may be composed of an expanding material such as neoprene to allow for expandably engaging the elongated transparent member 320 when it is properly positioned as illustrated in FIGS. 6 and 7. The illustrated releasable opening system further includes a zipper 354 and a tab 356 that are disposed on an opening or slit in the flexible tube 352. The zipper 354 may be selectively opened via the tab 356. Various other releasable opening systems may also be incorporated in accordance with the present invention including but not limited to VELCRO™.

Reference is next made to FIG. 6, which illustrates a profile view of the system illustrated in FIG. 5 in an assembled configuration. The optically opaque sleeve 350 is engaged over the elongated transparent member 320 as shown. The illustrated embodiment shows the optically opaque sleeve 350 extending along the elongated transparent member 320 to a point in which the portable illumination system 340 is internally disposed. This region of the elongated transparent member 320 may be referred to as the transparent portion or exposed transparent surface. The remainder of the elongated transparent member 320 is positioned over the portable illumination system 340 and therefore does not transmit illumination. Alternatively, the optically opaque sleeve 350 may be sized and positioned so as to cover the entire elongated transparent member 320. The process of engaging the optically opaque sleeve 350 over the elongated transparent member 320 may include aligning and engaging the optically opaque sleeve 350 with the elongated transparent member 320. The engagement may include expanding the optically opaque sleeve 350 and elastically coupling to the elongated transparent member 320.

In operation, the portable illumination system 340 may be selectively switched on to activate the illumination source 344 so as to produce illumination 360. The illumination 360 will then transmit in a dispersed illumination output. The illumination will transmit through the elongated transparent member 320 but will be absorbed or reflected by the internal surface of the optically opaque sleeve 350. This will cause the illumination 360 to be directed out a second opening of the elongated transparent member 320 in a discrete correlated illumination output.

Reference is next made to FIG. 7, which illustrates a profile view of the system illustrated in FIG. 5 in an alternative assembled configuration, where an opening is selectively opened and a cap 380 is positioned on the second opening of the elongated transparent member 320. The cap 380 is coupled to the elongated transparent member 320 and positioned so as to optically obstruct any illumination from transmitting out the second opening. The zipper 354 on the optically opaque sleeve 350 is opened via the tab 356. By opening the zipper 354, a portion of the elongated transparent member 320 is exposed thereby permitting illumination 360 to transmit through the elongated transparent member 320 and out the opening formed by the zipper 354. Therefore, a discrete illumination output can be selectively produced. Likewise, the zipper 354 may be resealed to contain the illumination.

In another alternative embodiment, an opaque gapped sleeve may be releasably coupled to a transparent hollow member so as to direct the illumination output in the direction of the gapped portion of the opaque sleeve. For example, a gapped sleeve may include a 15 degree illumination gap but also opaquely cover the remaining 345 degrees thereby effectively directing the output illumination. The opaque gapped sleeve may be fitted inside the transparent hollow member so as to internally block a portion of the output illumination but selectively allow a remaining portion of the output illumination. One example of an internal gapped sleeve may include an opaque paper slotted inside a transparent tube and sized to only cover 340 degrees of the tubes circumference. The opaque gapped sleeve may also be releasably coupled to the outside of the transparent hollow member. Various releasable coupling systems could be utilized between the gapped sleeve and the hollow transparent member including expansion friction coupling, contraction friction coupling, etc.

Figure 8:
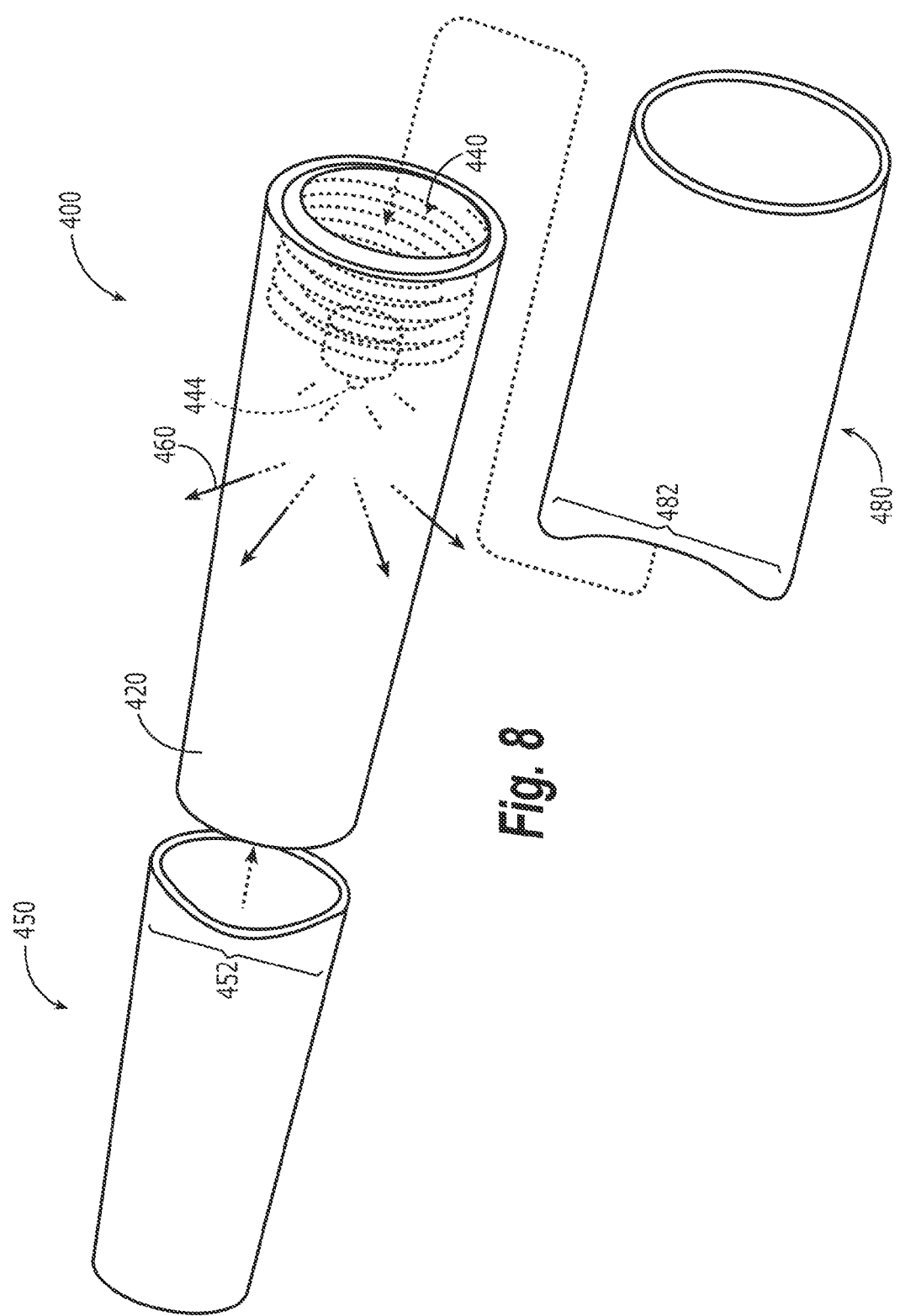
FIG. 8 illustrates a profile exploded view of a discrete optical correlation system including an adjustable aperture in accordance with a fourth embodiment of the present invention.

Reference is next made to FIG. 8, which illustrates a profile exploded view of a discrete optical correlation system including an adjustable aperture, designated generally at 400. The system 400 includes an optical illumination system, a first optically opaque sleeve 450, and a second optically opaque sleeve 480. The optical illumination system includes an elongated transparent member 420 and a portable illumination system 440. As discussed above with reference to FIG. 5, the portable illumination system 440 includes an output device 444 that selectively transmits and illumination output 460 through the elongated transparent member 420. Although illustrated as an electrical illumination system, it will be appreciated that a chemical illumination system may also be used in accordance with embodiments of the present invention. The first optically opaque sleeve 450 is coupled over a portion of the elongated transparent member 420 so as to partially cover the exposed transparent surface through which the illumination output 460 transmits. Likewise, the second optically opaque sleeve 480 is coupled over a different portion of the elongated transparent member 420 so as to partially cover the exposed transparent surface through which the illumination output 460 transmits. The first optically opaque sleeve 450 includes a concave curved cutout 452 on the proximal end with respect to the elongated transparent member 420. The concave curved cutout 452 extends over an outer circumferential region of the first optically opaque sleeve 450. The orientation of concavity is with respect to the elongated transparent member 420. Likewise, the second optically opaque sleeve 480 includes a second concave curved cutout 482 on the proximal end with respect to the elongated transparent member 420. The second concave curved cutout 482 extends over an outer circumferential region of the first optically opaque sleeve 450. It will be appreciated that alternative shaped concave curved cutouts may be utilized in accordance with embodiments of the present invention. Alternatively, the second optically opaque sleeve 480 may be replaced by an optically opaque fixed region disposed on the elongated transparent member 420 such as an opaque painted region or an opaque composition region.

Reference is next made to FIGS. 9A-9E, which illustrate various adjustable aperture positions of the system illustrated in FIG. 8. The first and second optically opaque sleeves 450, 480 are positioned over the elongated transparent member 420 so as to create an exposed transparent region 422 between the concave curved cutouts 452, 482 (see FIG. 8). The illumination output from the portable illumination system 440 is therefore able to transmit out through the exposed transparent region 422. The remaining transparent surface of the elongated transparent member 420 is optically obstructed and physically covered by the first and second optically opaque sleeves 450, 480. An optional opaque cover 490 may be disposed on a lengthwise end of the elongated transparent member 420 so as to optically obstruct a correlated illumination output 460, as illustrated in FIGS. 9A-9D.

Figure 9A:
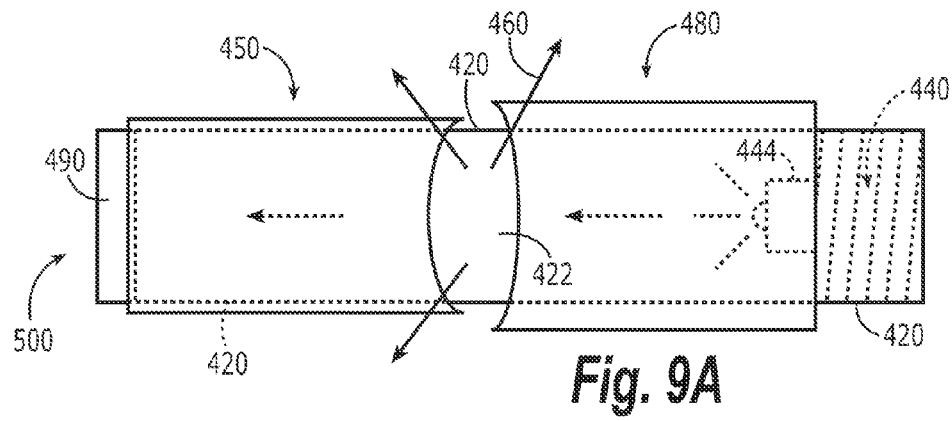
FIGS. 9A-9E illustrate various adjustable aperture positions of the system illustrated in FIG. 8.
Figure 9B:
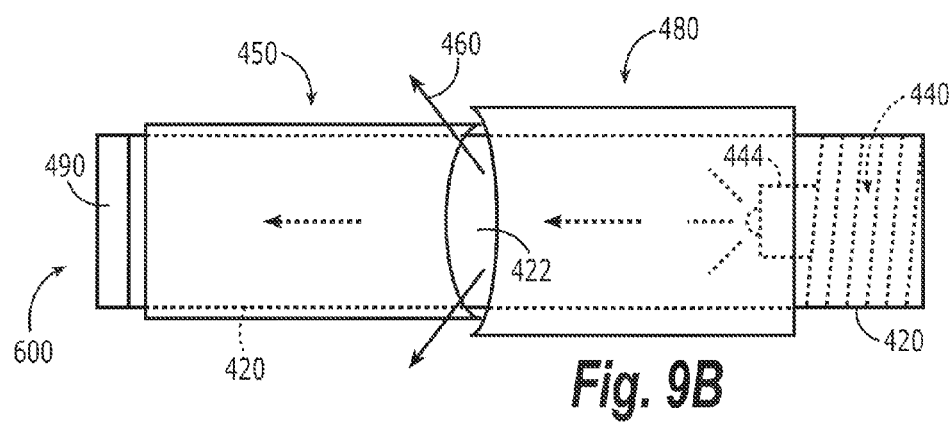
Figure 9C:
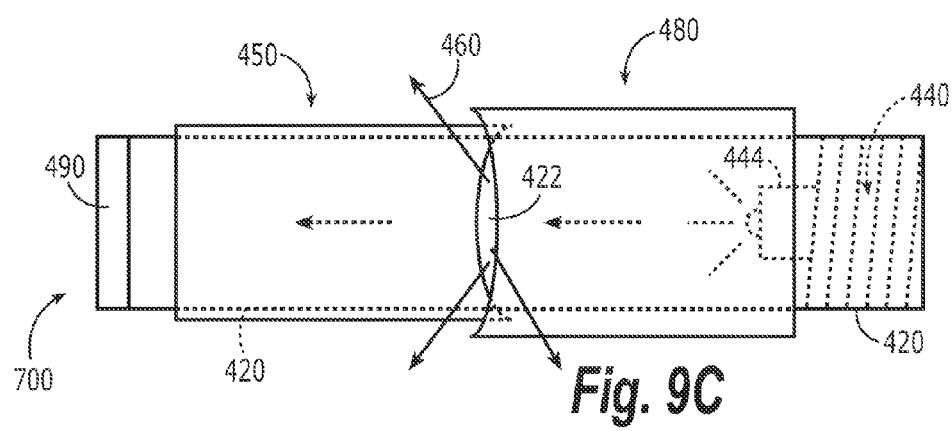
Figure 9D:
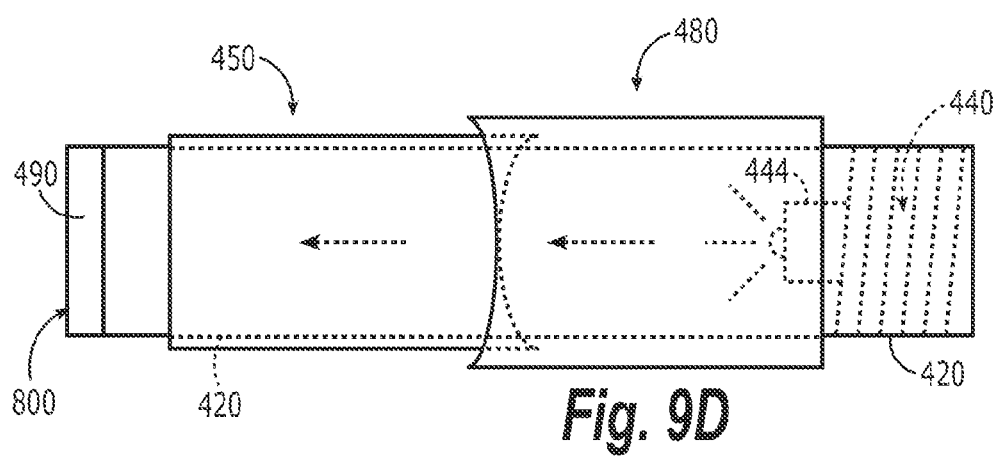
Figure 9E:
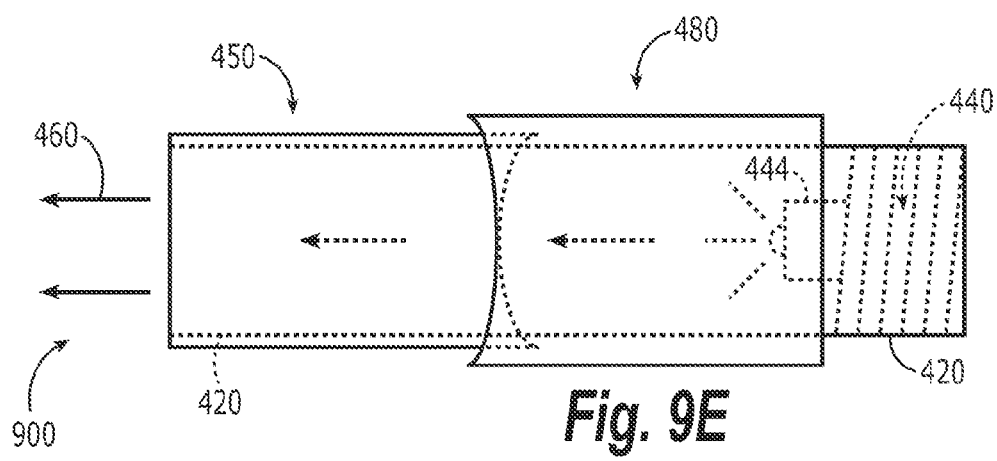
Figure 10A:
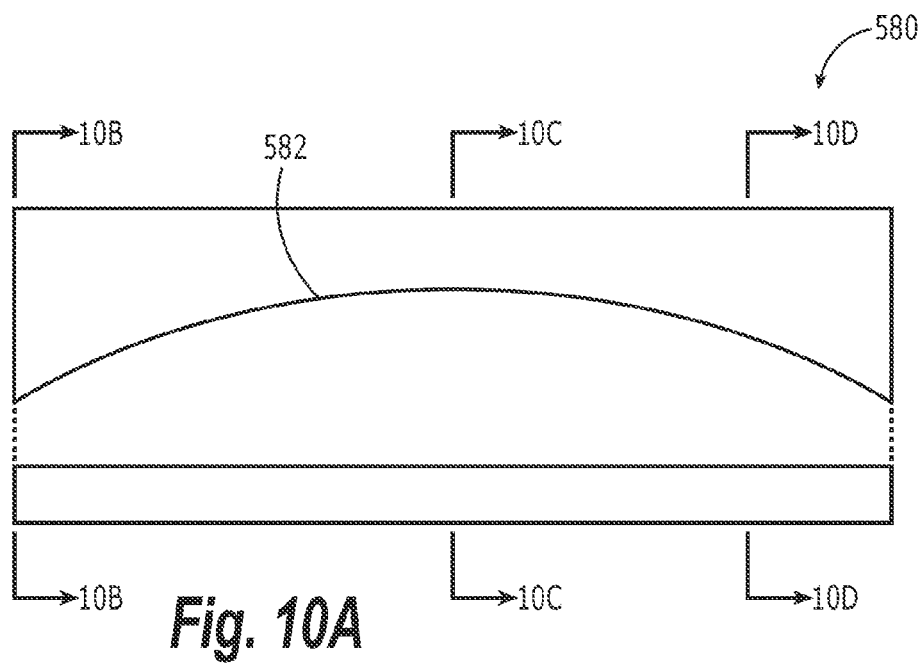
FIGS. 10A-D illustrate one alternative sleeve configuration in accordance with a fifth embodiment of the present invention.
Figure 10B:
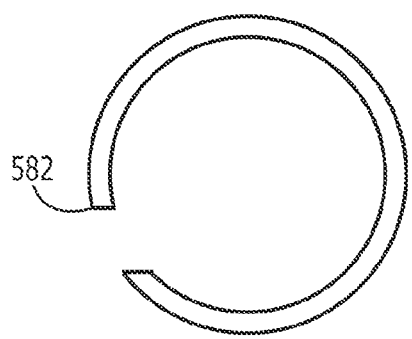
Figure 10C:
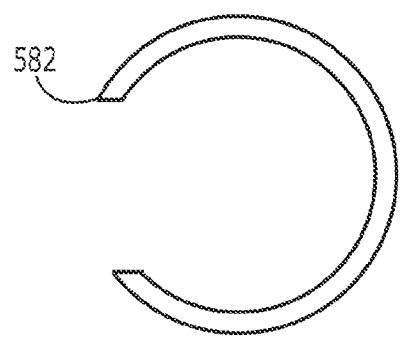
Figure 10D:
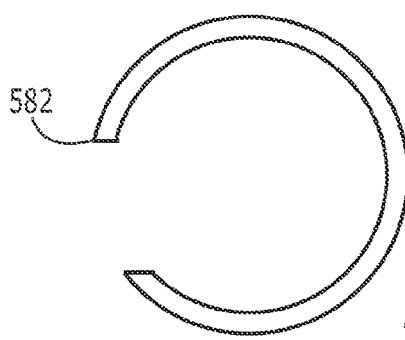
Figure 11A:
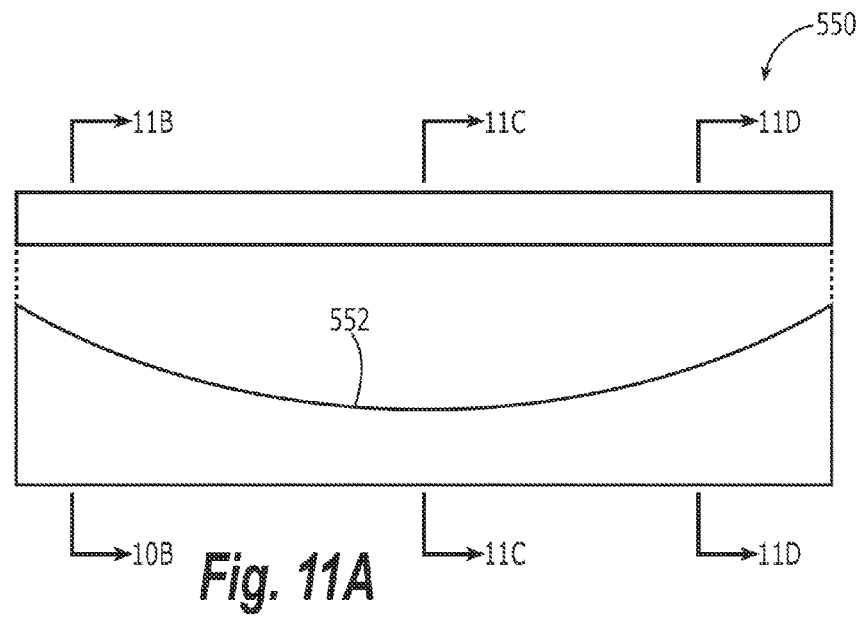
FIGS. 11A-D illustrate a corresponding second sleeve configuration for use in conjunction with the sleeve illustrated in FIGS. 10A-D.
Figure 11B:
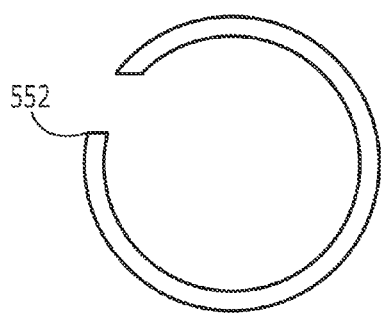
Figure 11C:
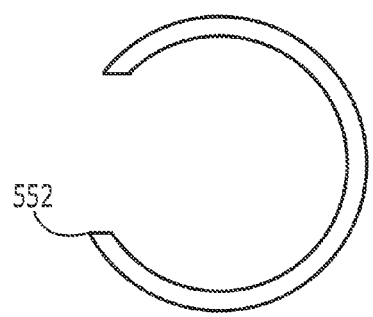
Figure 11D:
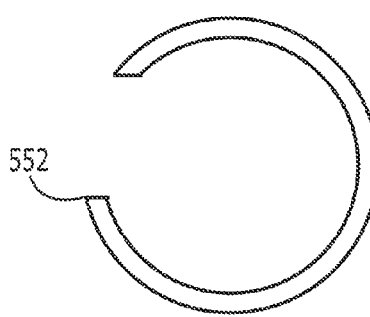

The exposed transparent region 422 creates an adjustable aperture for controlling the illumination output 460. An aperture relates to a multi-dimensional optical obstruction mechanism for controlling the characteristics of illumination output. As opposed to a single dimensional optical obstruction mechanism which may only adjust the width of an exposed region, but maintain a constant height. As the concave curved cutouts (452, 482) translationally overlap one another, the exposed transparent region 422 changes in both height and width thereby aperture adjusting the illumination output 460. In addition, the utilization of two opposing concave shaped regions optimizes the multi-dimensional narrowing of the exposed transparent region 422. FIGS. 9A through 9E represent a translational aperture progression of the first and second opaque sleeves 450, 480 over the elongated transparent member 420. As the first and second opaque sleeves 450, 480 translate closer in proximity to one another, the exposed transparent region 420 multi-dimensionally reduces in size effectively reducing the illumination output 460. This system may therefore be used to selectively control the illumination output 460 of a portable device. As illustrated in FIG. 9E, the cover 490 may be removed to facilitate a correlated illumination output 460 in accordance with other embodiments of the present invention.

Reference is next made to FIGS. 10A-D and 11A-D which illustrate an alternative sleeve configuration in which the concave curved cutouts are disposed on widthwise straight ends rather than lengthwise circular ends as illustrated in previous embodiments. The alternative embodiment includes a first and second optically opaque sleeve 550, 580 with corresponding concave cutouts 552, 582 disposed on the widthwise straight ends of the first and second optically opaque sleeve 550, 580. The first and second optically opaque sleeves 550, 580 do not entirely form a tube but rather includes a gapped region between the first and second widthwise straight ends. In this alternative embodiment, the two sleeves 550 and 580 are disposed such that the two concave curved cutouts 552, 582 rotationally overlap one another to create a rotationally adjustable exposed transparent region over a corresponding transparent member (Such as element 420 in FIG. 8). As the first and second optically opaque sleeves are rotated with respect to one another, the exposed transparent region is similarly adjusted in both height and width thereby aperture adjusting the illumination output similar to the fourth embodiment described and illustrated with reference to FIGS. 8 and 9A-E. It will be appreciated that only one of the sleeves needs to possess a concave curved cutout in order to facilitate the aperture adjustment. Likewise, it will be appreciated that one of the sleeves may be disposed within the elongated transparent member or affixed to the elongated transparent member. For example, an optically opaque sleeve of paint may be disposed on the internal side of the elongated transparent member while the other optically opaque sleeve is allowed to rotate externally with respect to the elongated transparent member.

Various other embodiments have been contemplated, including combinations in whole or in part of the embodiments described above. As discussed above, alternative illumination systems, releasable opening systems, form factors, compositions, coupling system, caps, etc. may be utilized and remain consistent with the present invention.

What is claimed is:

1. A discrete optical correlation system including an adjustable aperture comprising:
   an optical illumination system including an elongated transparent member coupled to a portable illumination system, wherein the portable illumination system further includes an on state and an off state, and wherein the portable illumination system transmits an optical illumination output in the on state, and wherein the optical illumination output is transmitted through the elongated transparent member;
   a first optically opaque sleeve slidably coupled over the elongated transparent member partially covering an exposed transparent surface of the elongated transparent member, wherein the first optically opaque sleeve includes a first and second end, and wherein a concave curved cutout is disposed on the second end; and
   a second optically opaque region disposed on the elongated transparent member partially obstructing the exposed transparent surface of the elongated transparent member, wherein the first optically opaque sleeve is slidably disposed over the second optically opaque region creating an exposed transparent region of the elongated transparent member between the concave curved cutout of the first optically opaque sleeve and the second optically opaque region, wherein the optical illumination output is externally transmitted through the exposed transparent region.

2. The system of claim 1, wherein the second end is in closer proximity to the lengthwise median of the elongated transparent member than the first end.

3. The system of claim 1, wherein the second optically opaque region is a second optically opaque sleeve slidably coupled over the elongated transparent member.

4. The system of claim 1, wherein the second optically opaque region includes an optically opaque material fixably disposed on the elongated transparent member.

5. The system of claim 1, wherein the second optically opaque region includes a second concave curved cutout, wherein the concavity orientation of the second concave curved cutout is opposing the concavity orientation of the concave curved cutout of the first optically opaque sleeve, and wherein the exposed transparent region is between the concave curved cutout of the first optically opaque sleeve and the second concave curved cutout of the second optically opaque region.

6. The system of claim 1, wherein the concave curved cutout extends across less than half of the outer circumference of the second end of the first optically opaque sleeve.

7. The system of claim 1, wherein the elongated transparent member and first optically opaque sleeve are substantially cylindrical shaped.

8. The system of claim 1, wherein the first and second ends of the first optically opaque sleeve are wrapped around the elongated transparent member.

9. The system of claim 1, wherein the concave curved cutout is oriented lengthwise with respect to the elongated transparent member.

10. The system of claim 1, wherein the concave curved cutout is oriented widthwise with respect to the elongated transparent member.

11. The system of claim 1, wherein the optical illumination system further includes an optically opaque cover releasably disposed on a lengthwise end of the elongated transparent member opposite the portable illumination system.

12. A method for aperture illumination output adjustment of a portable illumination system, comprising the acts of:
   providing an optically opaque sleeve with a first and second end, including a concave curved cutout on one of the ends;
   providing an optical illumination system including an elongated transparent member and the portable illumination system;
   positioning the optically opaque sleeve over an elongated transparent portion of the elongated transparent member optically obstructing an illumination output of the optical illumination system;
   translating the optically opaque sleeve over the elongated transparent member creating an exposed transparent region between the concave curved cutout of the optically opaque sleeve and an opaque region of the optical illumination system; and
   transmitting an aperture adjusted illumination output through the exposed transparent region as a function of the translational position of the optically opaque sleeve with respect to the elongated transparent member.

13. The method of claim 12, wherein the acts of providing an optically opaque sleeve and providing an optical illumination system further include providing:
   the optical illumination system including the elongated transparent member coupled to the portable illumination system, wherein the portable illumination system further includes an on state and an off state, and wherein the portable illumination system transmits an optical illumination output in the on state, and wherein the optical illumination output is transmitted through the elongated transparent member;

a first optically opaque sleeve slidably coupled over the elongated transparent member partially covering an exposed transparent surface of the elongated transparent member, wherein the first optically opaque sleeve includes a first and second end, and wherein a concave curved cutout is disposed on the second end; and a second optically opaque region extending over the elongated transparent member partially covering the exposed transparent surface of the elongated transparent member.

14. The method of claim 12, wherein the act of positioning the optically opaque sleeve over an elongated transparent portion of the elongated transparent member optically obstructing an illumination output of the optical illumination system includes substantially encapsulating the optically opaque sleeve over the elongated transparent member.

15. The method of claim 12, wherein the act of translating the optically opaque sleeve over the elongated transparent member creating an exposed transparent region between the concave curved cutout of the optically opaque sleeve and an opaque region of the optical illumination system includes creating the exposed transparent region between the concave curved cutout of the optically opaque sleeve and a second concave curved cutout disposed on the opaque region of the optical illumination system.

16. The method of claim 12, wherein the act of translating the optically opaque sleeve over the elongated transparent member creating an exposed transparent region between the concave curved cutout of the optically opaque sleeve and an opaque region of the optical illumination system includes rotating the optically opaque sleeve with respect to the elongated transparent member.

17. The method of claim 12, wherein the act of translating the optically opaque sleeve over the elongated transparent member creating an exposed transparent region between the concave curved cutout of the optically opaque sleeve and an opaque region of the optical illumination system includes aligning the concave curved cutout of the optically opaque sleeve with a corresponding second concave curved cutout of the opaque region.

18. The method of claim 12, wherein the act of transmitting an aperture adjusted illumination output through the exposed transparent region as a function of the translational position of the optically opaque sleeve with respect to the elongated transparent member includes optically obstructing all diffused illumination output of the optical illumination system other than the aperture adjusted illumination output.

19. The method of claim 12 further including optically covering a lengthwise end of the elongated transparent member obstructing a correlated illumination output.

20. A method for aperture illumination output adjustment of a portable illumination system, comprising the acts of:
providing:
an optical illumination system including an elongated transparent member coupled to the portable illumination system, wherein the portable illumination system further includes an on state and an off state, and wherein the portable illumination system transmits an optical illumination output in the on state, and wherein the optical illumination output is transmitted through the elongated transparent member;
a first optically opaque sleeve slidably coupled over the elongated transparent member partially covering an exposed transparent surface of the elongated transparent member, wherein the first optically opaque sleeve includes a first and second end, and wherein a concave curved cutout is disposed on the second end;
a second optically opaque region disposed on the elongated transparent member partially obstructing the exposed transparent surface of the elongated transparent member;
translating the first optically opaque sleeve over the elongated transparent member creating an exposed transparent region between the concave curved cutout of the first optically opaque sleeve and an opaque region of the optical illumination system; and
transmitting an aperture adjusted illumination output through the exposed transparent region as a function of the translational position of the first optically opaque sleeve with respect to the elongated transparent member.

* * * * *